(12) United States Patent
Borro et al.

(10) Patent No.: US 8,149,732 B1
(45) Date of Patent: Apr. 3, 2012

(54) CLEARING MESSAGE BROKER SYSTEM

(75) Inventors: Todd Borro, Chicago, IL (US); David Hoag, Naperville, IL (US); Ajay Madhavan, Aurora, IL (US)

(73) Assignee: Chicago Mercantile Exchange, Inc., Chicago, IL (US)

(*) Notice: Subject to any disclaimer, the term of this patent is extended or adjusted under 35 U.S.C. 154(b) by 1219 days.

(21) Appl. No.: 11/234,727

(22) Filed: Sep. 23, 2005

(51) Int. Cl.
H04L 12/56 (2006.01)

(52) U.S. Cl. .................. 370/254; 370/401

(58) Field of Classification Search .............. 370/392, 370/401
See application file for complete search history.

(56) References Cited

U.S. PATENT DOCUMENTS

| | | | |
|---|---|---|---|
| 5,870,556 A | 2/1999 | Cote et al. | |
| 6,333,933 B1* | 12/2001 | Yoshizawa et al. | 370/389 |
| 6,781,992 B1 | 8/2004 | Rana et al. | |
| 7,009,987 B1* | 3/2006 | Matsuzawa et al. | 370/409 |
| 7,143,060 B2* | 11/2006 | Foster et al. | 705/35 |
| 7,286,529 B1* | 10/2007 | Thomas | 370/389 |
| 7,394,772 B2* | 7/2008 | Shin et al. | 370/254 |
| 2001/0021189 A1* | 9/2001 | Shiota | 370/389 |
| 2003/0105800 A1* | 6/2003 | Cullen | 709/201 |
| 2003/0165139 A1* | 9/2003 | Chen et al. | 370/392 |
| 2004/0052212 A1* | 3/2004 | Baillargeon | 370/235 |
| 2004/0215596 A1* | 10/2004 | Fukuhara et al. | 707/1 |
| 2005/0025051 A1* | 2/2005 | Roeder | 370/230 |
| 2005/0117576 A1* | 6/2005 | McDysan et al. | 370/389 |
| 2005/0243824 A1* | 11/2005 | Abbazia et al. | 370/390 |
| 2005/0278410 A1 | 12/2005 | Espino | |
| 2006/0036679 A1 | 2/2006 | Goodman et al. | |
| 2006/0215666 A1* | 9/2006 | Shepherd et al. | 370/400 |

OTHER PUBLICATIONS

Fenner & Meyer, "RFC 3618: Multicast Source Discovery Protocol (MSDP)", Oct. 2003.*
IBM Technical Disclosure Bulletin, "Header for Messages within a Computer Network", Jul. 1972, vol. 5, No. 2, pp. 586-588.
Non-Final Office Action for U.S. Appl. No. 11/381,287 dated Jan. 23, 2009.
Final Office Action for U.S. Appl. No. 11/381,287 dated Jul. 22, 2009.

* cited by examiner

*Primary Examiner* — Chirag Shah
*Assistant Examiner* — Salvadore E Rivas
(74) *Attorney, Agent, or Firm* — Banner & Witcoff, Ltd.

(57) ABSTRACT

Systems and methods are provided for efficiently permitting the transmission and receipt of trading messages between message sources configured to use a variety of different protocols. Messaging gateways may be configured to reformat messages for proper transmission across a transport mechanism. Routers may be dynamically partitioned so that manual reconfiguration is not required when sources and/or routers are added or deleted. The routers may be configured to route messages based on content to limit the amount of formatting required at message sources.

25 Claims, 4 Drawing Sheets

CLEARING MESSAGE BROKER SYSTEM

FIELD OF THE INVENTION

The present invention relates to distributed computing systems that exchange messages. More particularly, aspects of the invention providing messaging systems and methods that may be used by exchange computer systems to exchange messages in a cost-efficient manner.

DESCRIPTION OF THE RELATED ART

Modern exchanges use a variety of different computer systems to match trades, clear trades and perform other exchange functions. It is common for exchanges to use computer hardware and software that rely on point-to-point routing of messages between applications that are initially designed to support different protocols. For example, a software application may be structured to create messages formatted in accordance with a first protocol and another software application may only be able to interpret messages formatted in accordance with a second protocol.

Typically these types of incompatibility issues have been addressed by modifying the software applications. In the example given above, the software application creating the message may be modified to create messages formatted in accordance with the second protocol. When the number of software applications and transport mechanisms reach the level found at modern exchanges, the overhead incurred in modifying applications and transport mechanisms so that each application is capable of communicating with all other relevant applications becomes enormous. For example, adding a software application may require modifying several other existing applications, which may have already been modified before.

Therefore, there is a need in the art for systems and methods that allow application to communicate with one another while reducing the overhead incurred in maintaining such systems.

SUMMARY OF THE INVENTION

Aspects of the present invention overcome problems and limitations of the prior art by providing trading methods and systems to more efficiently provide for the transmission and receipt of trading messages. One aspect relates to associating an application to a messaging gateway that may be configured to alter the message for proper transmission. In one embodiment, the messaging gateway formats the message for proper transmission through one or more transport protocols. In yet another embodiment, the messaging gateway formats the message to allow another unrelated application to receive and/or read the message. Another aspect relates to assigning one router with a distributed computing environment to serve as a partitioning coordinator router. The dynamic partitioning of the routers does not require reconfiguration of the router to the specific sources or applications it has been assigned to. In one embodiment, the first router detected may serve as the partitioning coordinator router. Yet still further aspects of the invention relate to allowing the partitioning coordinator router to dynamically partition the available sources or applications configured to transmit among the available routers. Computer readable instructions may comprise routing rules configured, that when executed, allow for content based routing as opposed to point-to-point based routing. The content based routing may be accomplished regardless of the protocols of the different sources and/or endpoints and Of course, the methods and systems of the above-referenced embodiments may also include other additional elements, steps, computer-executable instructions, or computer-readable data structures. In this regard, other embodiments are disclosed and claimed herein as well.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION OF THE INVENTION

Figure 1:
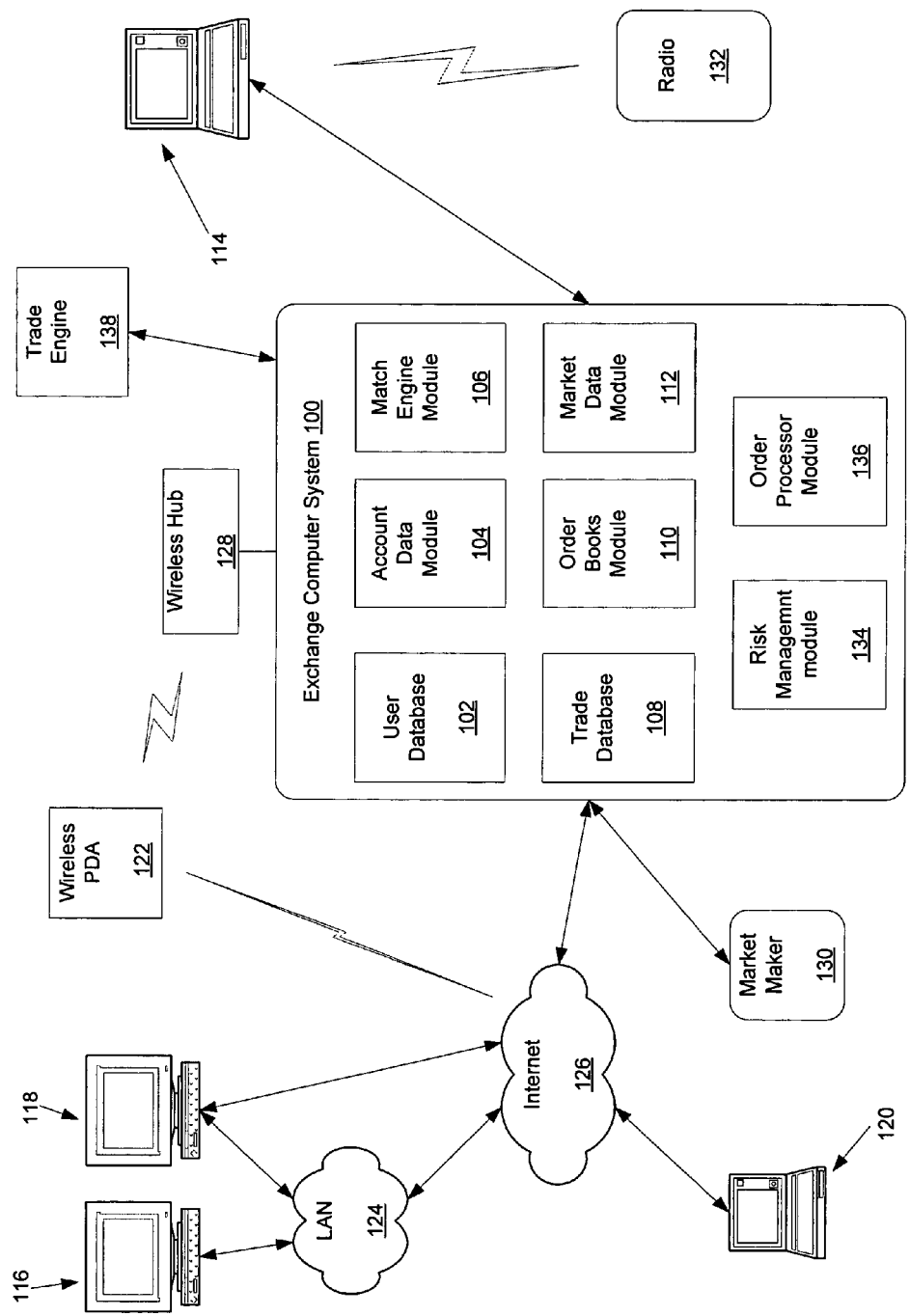
FIG. 1 shows a computer network system that may be used to implement aspects of the present invention.

Aspects of the present invention may be implemented with computer devices and computer networks that allow exchanges to process trades and exchange data among applications. An exemplary trading network environment for implementing trading systems and methods is shown in FIG. 1. An exchange computer system 100 receives orders and transmits market data related to orders and trades to users. Exchange computer system 100 may be implemented with one or more mainframe, desktop or other computers. A user database 102 includes information identifying traders and other users of exchange computer system 100. Data may include user names and passwords potentially with other information to identify users uniquely or collectively. An account data module 104 may process account information that may be used during trades. A match engine module 106 is included to match bid and offer prices. Match engine module 106 may be implemented with software that executes one or more algorithms for matching bids and offers.

A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose variable defined derivative product and aggregate order types for processing by order book module 110 and match engine module 106.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems. Coupling can be direct as described or any other method described herein.

The operations of computer devices and systems shown in FIG. 1 may be controlled by computer-executable instructions stored on a computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Figure 2:
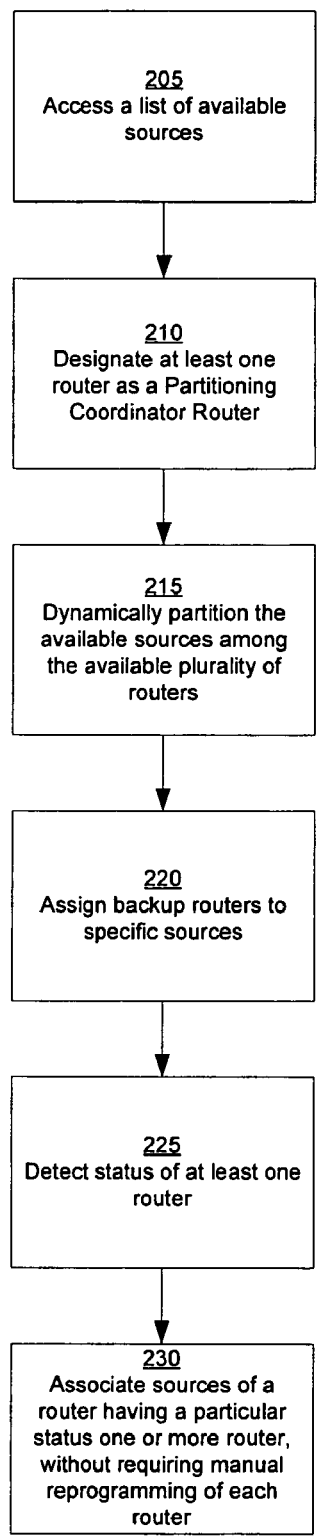
FIG. 2 illustrates a flowchart of one exemplary computer implemented method according to one embodiment of the present invention.
Figure 3:
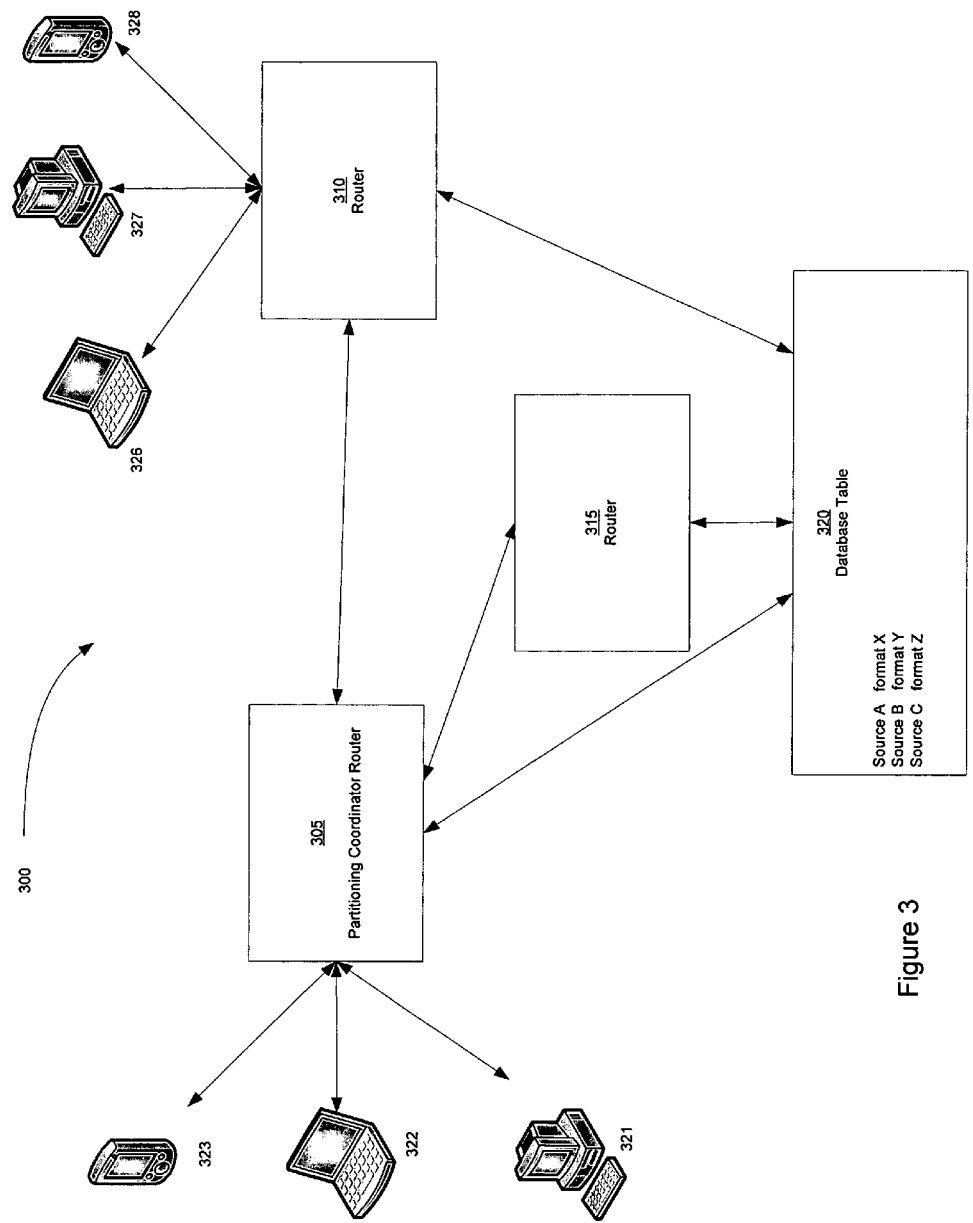
FIG. 3 shows one exemplary distributed computing system that may be used to implement one or more aspects of the invention.

FIG. 2 illustrates a flowchart of one exemplary computer implemented method according to one embodiment of the present invention. In step 205, a router accesses a list of available message sources. The message sources may comprise software applications that are configured to communicate with one another. The software applications may be developed by different vendors and use inconsistent messaging protocols. As illustrated, the messages may comprise information relating to trading, such as clearing information, orders, etc. One exemplary distributed computing system that may be used to implement step 205 is shown in FIG. 3. As seen in FIG. 3, distributed computing system 300 comprises a plurality of routers, such as routers 305, 310, and 315. One skilled in the art will readily appreciate that additional or fewer routers may be utilized in different embodiments of the disclosed invention and three routers are shown for illustrative purposes only. Each of the routers 305, 310, and 315 may access the list of available message sources, such as database table 320. As seen database table 320, a plurality of message sources may be provided. As one skilled in the art will realize, the list of available message sources may be in any form or format as to permit information transfer to and from the routers.

Returning briefly to FIG. 2, step 210 may be initiated to designate one of the plurality of routers as a partitioning coordinator router. The partitioning coordinator router may be the first router to be placed on-line or start. As seen in FIG. 3, router 305 has been designated as the partitioning coordinator router. In at least one embodiment of the invention, any of the plurality of routers in the distributed computing system may serve as the partitioning coordinator router. Each of the plurality or at least a subset of the plurality of routers comprises computer executable instructions to serve as the partitioning coordinator router. Indeed, in yet other embodiments, the duties and partitioning functions of the partitioning coordinator router (described below) may be distributed among several routers.

In the illustrated embodiment, router 305 may be the first router to be placed on-line or otherwise to be detected by the system 300 and therefore determined to be the partitioning coordinator router. As one skilled in the art will readily understand, any set of criteria may be used to determine which router(s) are selected as a partitioning coordinator router, such as for example, reliability, total bandwidth, available bandwidth, status, and or location of the router.

At step 215, the partitioning coordinator router dynamically partitions the available sources among the available plurality of routers. Step 215 may include accessing a list of message sources, such as that in database table 320, and assigning the messages sources to specific routers. The dynamic partitioning allows the sources of the messages to be "assigned" to a router without requiring reconfiguration of the router to specific sources. As seen in FIG. 3, sources 321-323 have been assigned to router 305 and sources 326-328 have been assigned to router 310. When new message sources are added, database table 320 may be updated to list the sources and the sources will be assigned to routers at the next dynamic partitioning step. Dynamic partitioning may be initiated at router start up, periodically, when new sources are added, at a time selected by a user or any other time.

Optional step 220 may be implemented to assign "backup" routers to specific sources. For example, while source 321 is associated with router 305, router 310 may be assigned as a backup router to source 321, wherein upon the malfunctioning of router 305, source 321 may be associated with router 315.

Step 225 may also be implemented to detect the status of one or more of the routers, such as for example, when a router goes "offline", malfunctions, or is overwhelmed with requests. In one embodiment, a status signal may be in the form of a heartbeat signal, wherein heartbeat messages may be transmitted from the routers to ensure they are functioning properly. In one such embodiment, available routers may be deemed "available" if heartbeat messages are received from the routers within a predetermined period of time. Conversely, if a heartbeat signal is not received from a router within a predetermined amount of time, the router may be deemed malfunctioning and any associated sources may be reassigned to other available routers. In those embodiments utilizing a backup router as described above, the available sources may be associated with a predetermined backup router. Yet in other embodiments, the sources associated with the malfunctioning router may be dynamically partitioned by the partitioning coordinator router, for example by initiating step 230.

In yet other embodiments, one or more routers may be configured to send a status signal indicating their status. For example, if router 315 is configured to handle a maximum of 100 message sources per unit of time and is already close to, at, or above that maximum threshold, a status signal may be transmitted from router 315 to another router or any computing device within the computing system 100. The signal may be used to reassign some sources to other available routers. Indeed, one skilled in the art will realize the status signal may be configured to provide any information regarding the status of the router or associated sources.

In the event that a router goes offline, is overwhelmed with requests, or becomes unavailable, step 230 may be implemented to reassign or otherwise associate those sources associated with the particular router with another available router. This is done without requiring manual reprogramming of each router. Likewise step 230 may be implemented to reassign sources when a new router becomes available, underutilized or otherwise desirable to have the source associated with. As one skilled in the art will realize, all the reassigned sources may not collectively be reassigned to another router, but rather may distributed among other routers depending on a myriad of factors, such as the format and/or content of messages being communicated to/from those sources.

Figure 4:
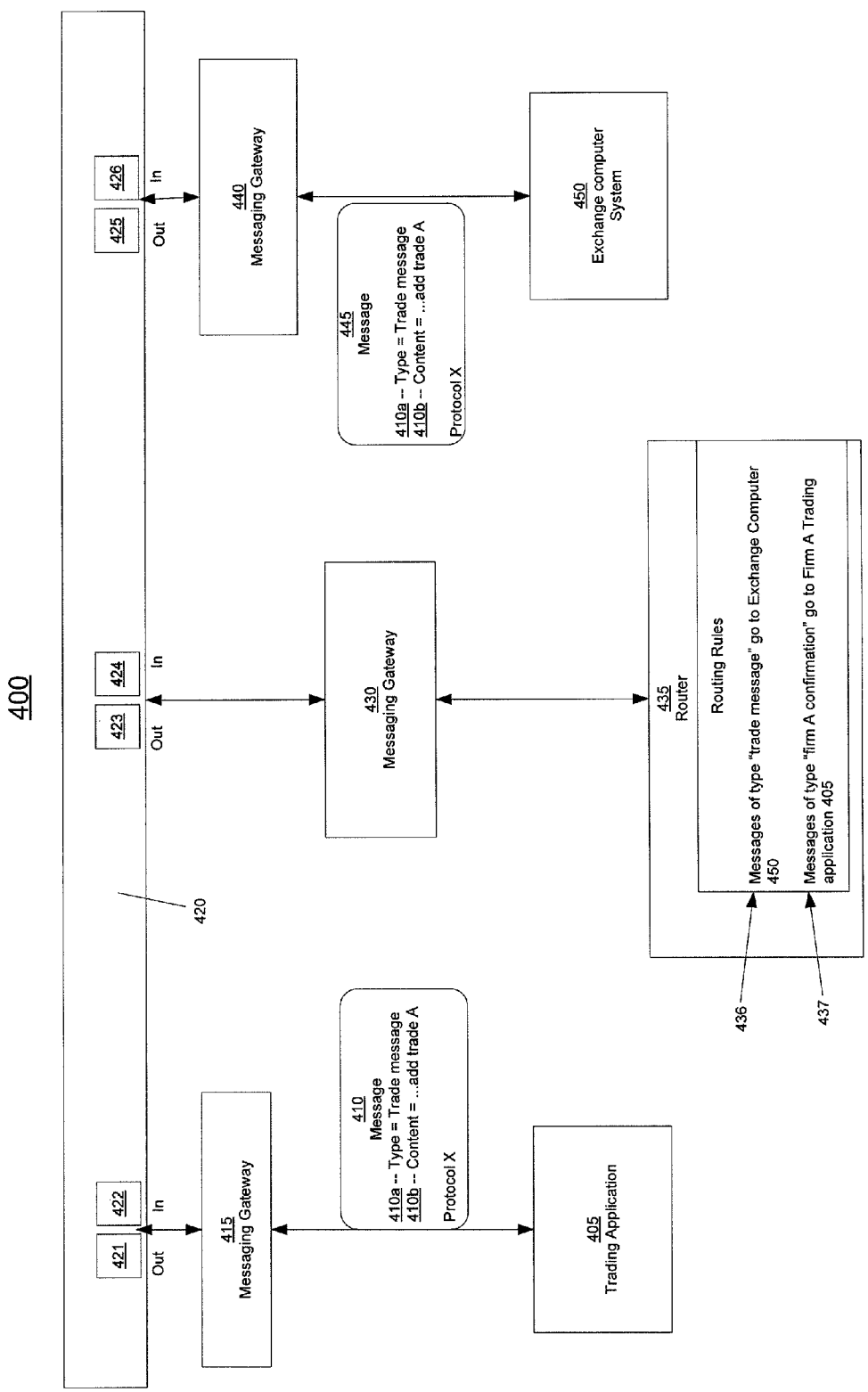
FIG. 4 shows one illustrative trading application communicating with an exchange computer system through at least one router in a distributed computer environment according to one embodiment of the invention.

FIG. 4 shows one illustrative trading application communicating with an exchange computer system through at least one router in a distributed computer environment according to one embodiment of the invention. For example trading application 405 may be configured to initiate an order or otherwise transmit and receive trading data with one or more computers in a distributed computing system. As seen in FIG. 4, trading application 405 is configured to be in operative communication with exchange computer system 450 through the distributed computing system 400. As will be explained in greater detail below, trading application 405 may be configured to communicate with a plurality of computers, some of which may have differing functions than exchange computer system 450.

In one embodiment, trading application 405 may be a source, (such as source 321) that is associated with router 435. As previously discussed, in such an embodiment, trading application 405 may be associated with another router if router 435, for example, becomes unavailable or overwhelmed with other sources. Trading application 405 may be for example, software, hardware, firmware, or indeed any computer readable instructions capable of sending and/or receiving a message or permitting other instructions to send and/or receive a message to another computing device. The trading application may communicate with other peripherals and computers within the system 400 by wired or wireless protocols.

In the illustrated embodiment, trading application 405 is configured to transmit message 410. Message 410 comprises a message type 410a and content 410b. The message type may be used to categorize the type of message. For example, the message type 410a indicates that message 410 is a trade message. One skilled in the art will realize that the system 400 may be configured to allow a vast array of message categories that may be updated or otherwise changed over time by an administrator or end users. Indeed, in one embodiment, the type of the message determines one or more transport protocols that may be used to transport the message. In the illustrated embodiment, message 410 includes content 410b comprising "add trade A". While the content in message 410 is in plain text, it is to be understood that any alphanumeric combination may be used. Indeed, in one embodiment, the content of the message may be computer executable code. Message 410 may be in any format, including propriety or open-source. The label "Protocol X" has been placed within the message to more readily illustrate aspects of the invention to the reader. As discussed above and throughout the specification, the format and protocol of messages may be distinct from other messages from other applications and/or sources communicating within the distributed computing system 400.

As seen in the FIG. 4, message 410 may then be received at messaging gateway 415. Messaging gateway 415 is configured to place message 410 and other received messages into a proper format to be transferred through a transport mechanism, such as transport mechanism 420. Transport mechanism 420 may be any computer aided method of transmitting data, such as sockets, e-mail servers, or indeed any method known to those skilled in the art or developed in the art to electronically transport information. For example, in one embodiment the message may be in HTML format and transported across the web or other network supporting HTML, whereas in another embodiment a plurality of differing transport mechanisms are utilized to deliver the messages.

As one skilled in the art will readily appreciate, trading messages may not be received at a messaging gateway in the order it was received. For example, source 327 may be in communication with message gateway 310 through a high speed connection that allows more messages to be received in a shorter time frame than a message received from source 328. It is often important to process the trading messages in a sequential order. In one embodiment of the invention, the messages entering the message gateway further comprise a message ID or other mechanism to allow the message gateways to determine the proper sequence of the messages. Therefore, although the message gateways may be configured to simultaneously process a plurality of messages (even from different sources), the message gateway may be configured to allow concurrent processing with sequence preservation.

The transport mechanism may communicate with a plurality of messaging gateways, such as messaging gateways 415, 430 and 440 through one or more input ports (see, for example, ports 422, 424, and 426) and one or more output ports (see, for example, ports 421, 423, and 425). For example, outgoing message 410 may be received in input port 422 and transmitted first to messaging gateway 430 through output port 423. As seen in FIG. 4, messaging gateway 430 is associated with router 435, wherein messaging gateway 430 may be configured to listen for messages transmitted to or otherwise received at the router 435. While the figure shows the messaging gateways and the router (such as messaging gateway 430 and router 435) as two separate structures, in one alternative embodiment, messaging gateways may perform the function of the disclosed routers and may further allow for point-to-point communications in addition with communications disclosed herein. One or more the disclosed messaging gateways may also be configured to manage transactions and threads on behalf of client systems, which may include routers. Many of the aspects of the invention are illustrated to the user as individual structures to more readily portray to various embodiments; however, each of the illustrated structures may be combined.

As router 435 illustrates, a set of routing rules may be applied to a message incoming to the router. The routing rules may be stored on a computer readable medium within a router, for example, a partitioning coordinating router, such as router 305, or in a plurality of the routers within the distributed computing system. Rules 436 and 437 provide exemplary rules that may be used in one embodiment of the invention. The routing rules may be configured to allow for content based routing as opposed to point-to-point based routing. As previously mentioned, the content based routing may be accomplished regardless of the protocols of the different sources and/or endpoints.

Looking to rule 436, it has instructions to indicate messages having the content "add trade A" are to be routed to exchange computer system 450. Upon receiving message 410 and analyzing at least a portion of its content with the rules, it is determined where to transmit the message. In the illustrated example, message 410 is transmitted to exchange computer system 450. The message may then be again routed through messaging gateway 430 or a separate gateway to format the outgoing message based on the protocol(s) utilized by the application to receive the message at system 450. In this manner, trading application 405 may utilize a different protocol than exchange computer system 450 and still receive the message without substantial inefficiencies. Messaging gateway 430 may also reformat or adjust the message or container holding the message to a format to properly be transmitted across the transport layer or layers that the message The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims. All are considered within the sphere, spirit, and scope of the invention. For example, aspects of the invention may be used with any number of combinations of spread strategies that when examined on a link-by-link basis are comprised of the same underlying financial instruments.

What is claimed is:

1. An exchange computer system comprising:
a plurality of routers configured to route messages;
a computer readable medium storing the identification of a plurality of message sources that generate messages;
a partitioning coordinator router programmed with computer-executable instructions to cause the partitioning coordinator router to perform the steps comprising:
(a) accessing the identification of the plurality of message sources,
(b) dynamically partitioning the plurality of message sources among the plurality of routers to create a first assignment of the plurality of message sources to the plurality of routers,
(c) determining to initiate a partitioning of the plurality of message sources among the plurality of routers,
(d) in response to (c), dynamically partitioning the plurality of message sources among the plurality of routers to create a second assignment of the plurality of message sources to the plurality of routers, wherein the second assignment is different from the first assignment, and
(e) after not receiving a status signal within a predetermined period of time from a router configured to transmit the status signal within a predetermined period of time,
reassigning sources associated with the router configured to transmit a status signal to at least one other router within the exchange computer system without requiring reconfiguration of the at least one other router to the sources being reassigned to the at least one other router;
a messaging gateway in operative communication with the at least one message source, the messaging gateway configured to place a message transmitted from the at least one message source into a proper format to be transferred through a transport mechanism.

2. The exchange computer system of claim 1, wherein the plurality of message sources includes a match engine.

3. The exchange computer system of claim 1, wherein the plurality of message sources includes a trade clearing application.

4. The exchange computer system of claim 1, wherein (b) is performed at startup of the partitioning coordinator router.

5. The exchange computer system of claim 1, wherein (b) is performed when a new message source is added.

6. The exchange computer system of claim 1, wherein (b) is performed at a predetermined time.

7. A computer implemented method of configuring a distributed computing system having a plurality of routers configured to route messages, the method comprising:
(a) storing an identification of a plurality of available message sources that are configured to communicate with one another;
(b) accessing with a partitioning coordinator router the identification of the plurality of available message sources;
(c) dynamically partitioning the plurality of available message sources among a plurality of routers that includes the partitioning coordinator router to create a first assignment of the plurality of available message sources to the plurality of routers;
(d) determining to initiate a partitioning of the plurality of available message sources among the plurality of routers;
(e) in response to (d), dynamically partitioning the plurality of available message sources among the plurality of routers to create a second assignment of the plurality of available message sources to the plurality of routers, wherein the second assignment is different from the first assignment;
(f) configuring at least one router to transmit a status signal to the partitioning coordinator router within a predetermined period of time,
(g) after not receiving a status signal within a predetermined period of time,
reassigning sources associated with the at least one router to at least one other router within the distributed computing system without requiring reconfiguration of the at least one other router to the sources that are being reassigned to the at least one other router; and
(h) providing a messaging gateway to be in operative communication with at least one of the message sources, the messaging gateway being configured to place a message transmitted from the at least one message source into a proper format to be transferred through a transport mechanism.

8. The computer implemented method of claim 7, wherein (b) comprises designating a first router detected within the distributed computer system as the partitioning coordinator router.

9. The computer implemented method of claim 7, wherein a designation of the partitioning coordinator router is based on a factor of the router selected from the group consisting of: reliability, total bandwidth, available bandwidth, status, location and combinations thereof.

10. The computer implemented method of claim 7, further comprising:
  (i) assigning at least one of the plurality of routers as a backup router;
  (j) periodically receiving an indication of the status of the partitioning coordinator router; and
  (k) when the partitioning coordinator router malfunctions, repartitioning the sources so that the at least one backup router performs the function of the partitioning coordinator router.

11. The computer implemented method of claim 7, further comprising the step of: (i) upon receiving the status signal in (f), deciphering the signal to determine whether to reassign the sources assigned to the at least one router transmitting the status signal to another router among the plurality of routers.

12. The computer implemented method of claim 7, wherein (d) comprises starting up the partitioning coordinator router.

13. The computer implemented method of claim 7, wherein (d) comprises determining that a new message source was added.

14. A distributed computing system for exchanging trading information comprising:
  (a) at least one message source configured to transmit a trade message, wherein the trade message comprises content;
  (b) a messaging gateway in operative communication with the at least one message source that is configured to communicate with other message sources, the messaging gateway being configured to place a message transmitted from the at least one message source into a format to be transferred through a transport mechanism;
  (c) a plurality of routers, comprising at least one partitioning coordinator router, and each including a computer readable medium having computer readable instructions for:
    (i) dynamically partitioning available message sources among the plurality of routers to create a first assignment of the available message sources to the plurality of routers,
    (ii) determining to initiate a partitioning of the available message sources among the plurality of routers,
    (iii) in response to (ii), dynamically partitioning the available message sources among the plurality of routers to create a second assignment of the available message sources to the plurality of routers, wherein the second assignment is different from the first assignment; and
  (d) a computer readable medium having computer readable instructions comprising routing rules for routing the trade message of (a) to a computing device in the distributed computing environment based upon the content of the trade message, and
  wherein
    at least one router is configured to transmit a status signal to the partitioning coordinator router within a predetermined period of time, and
    at least one router is configured to, after not receiving the status signal within a predetermined period of time, reassign sources associated with the router configured to transmit the status signal to at least one other router of the plurality within the distributed computing system without requiring reconfiguration of the at least one other router of the plurality to the sources that are being reassigned to the at least one other router of the plurality.

15. The distributed computing system of claim 14, wherein the at least one message source comprises a plurality of different applications.

16. The distributed computing system of claim 15, wherein the plurality of different applications are not configured to create and process messages with a single format.

17. The distributed computing system of claim 14, wherein computer readable medium having the computer readable instructions for dynamically partitioning the available sources is integrated with the partitioning coordinator router.

18. The distributed computing system of claim 14, further comprising:
  (e) a message gateway in operative communication with at least one of the routers, wherein upon the message being routed by the router, the message is transmitted to the message gateway and altered for transport through a transport mechanism.

19. The distributed computing system of claim 14, further comprising:
  (e) a message gateway in operative communication with at least one of the routers and configured to change the format of received messages into a format that may be interpreted by applications at endpoints.

20. The distributed computing system of claim 14, wherein (ii) comprises starting up the partitioning coordinator router.

21. The distributed computing system of claim 14, wherein (ii) comprises determining that a new message source was added.

22. A method of transporting a trade message in a distributed computing system comprising a plurality of routers, the method comprising the steps of:
  (a) detecting a plurality of routers within the distributed computing system;
  (b) dynamically partitioning a plurality of available message sources that are configured to communicate with one another among the plurality of routers, wherein (b) comprises
    (i) dynamically partitioning the plurality of available message sources among the plurality of routers to create a first assignment of the plurality of available message sources to the plurality of routers;
    (ii) determining to initiate a partitioning of the plurality of available message sources among the plurality of routers; and
    (iii) in response to (ii), dynamically partitioning the plurality of available message sources among the plurality of routers to create a second assignment of the plurality of available message sources to the plurality of routers, wherein the second assignment is different from the first assignment;
  (c) transmitting from one of the message sources to a message gateway a trade message comprising content;
  (d) altering a format of the trade message at the message gateway so that the message is in a format that may be interpreted by a destination message source;
  (e) routing the trade message to an associated router from (b), wherein routing of the trade message at the router is based upon the content of the message;

(f) configuring at least one router to transmit a status signal to a partitioning coordinator router within a predetermined period of time; and (g) after not receiving a status signal within a predetermined period of time, reassigning sources associated with the at least one router to at least one other router within the distributed computing system without requiring reconfiguration of the at least one other router to the sources that are being reassigned to the at least one other router.

23. The method of claim 22, wherein the messages further comprise a message ID and the message gateway is configured to provide sequence preservation while permitting simultaneous concurrent processing of a plurality of messages.

24. The method of claim 22, wherein the message further comprises a type, wherein the type of the trade message determines at least one transport mechanism that is utilized to transport the message.

25. The method of claim 22, wherein one of the available message sources includes a match engine.

* * * * *